INVENTORS
Alexander O. Bally and
David J. S. Wardale.
BY William D. Fosdick
AGENT 3,299,938
GAS-FIRED RADIANT BURNER
Alexander O. Bally and David J. S. Wardale, both of Corning, N.Y., assignors to Corning Glass Works, Corning, N.Y., a corporation of New York
Filed Mar. 29, 1965, Ser. No. 443,472
9 Claims. (Cl. 158—7.5)

This invention relates to gas-fired infrared radiant burners, and in particular to a novel construction for such burners.

Radiant gas burners are known in the art and are described, for example, in United States Patents 1,896,286, issued to Burns et al., 2,775,294, issued to Schwank, and 2,870,830, issued to Schwank. In such burners, combustible gases are introduced into a plenum chamber, one wall of which comprises a porous radiating plate, such as a ceramic honeycomb structure of the type utilized in the burner of United States Patent 3,161,227, issued to Goss et al. The flow of combustible gases through the radiating plate is regulated so that combustion takes place near the outer surface thereof, thereby causing the plate to be heated to a temperature at which infrared heat radiation is emitted therefrom.

In the past, radiant gas burners have not operated at peak efficiency, since the heat remaining in the gaseous products of combustion after the gases have been utilized to heat the burner plate has generally not been directed to the same space heated by the infrared radiant energy emitted by the radiating plate. It is an object of the present invention to provide a novel burner arrangement which permits the utilization of the residual heat in gases produced by the burner in order to increase the heat-radiating efficiency of an infrared radiant gas burner. A corollary object of the invention is to permit such burners to be operated with a minimum rate of gas consumption.

A further object is the provision of a radiant gas burner which is protected from adverse atmospheric conditions, thereby permitting the burner to be employed in conditions of high wind and rain.

A further object is the provision of a radiant gas burner in which the temperature of the exhaust gases is minimized, thereby reducing the danger of overheating of the external burner support structure.

These and other objects, which will be apparent from the detailed description of the invention, are accomplished by the provision of a radiant gas burner including an enclosed combustion chamber having an outer wall capable of transmitting infrared radiation, the combustion chamber communicating, through an auxiliary porous radiating plate, with an auxiliary chamber located adjacent to a plenum chamber and permitting the utilization of the heat energy contained in the hot gases exhausted from the combustion chamber to produce infrared heat radiation from the auxiliary radiation plate and to preheat the gases in the plenum chamber.

Figure 1:
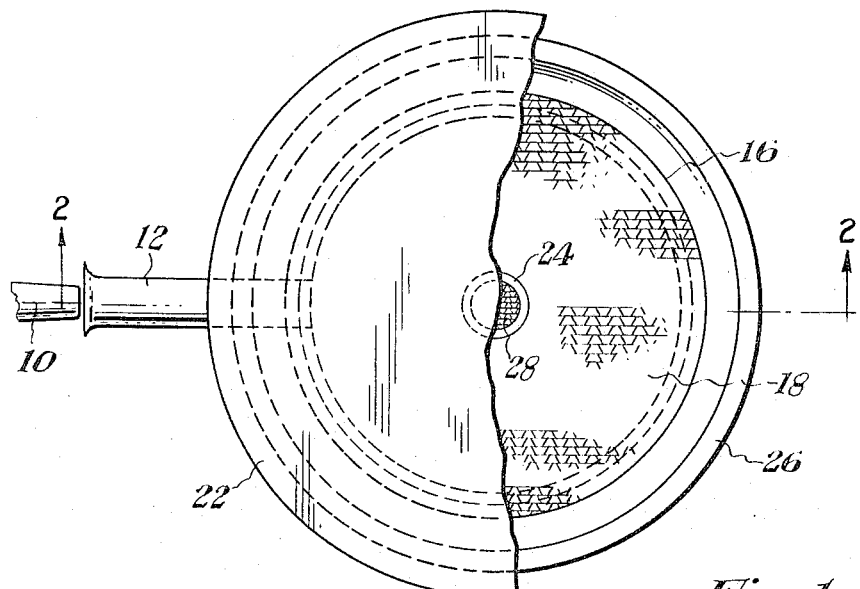
Figure 2:
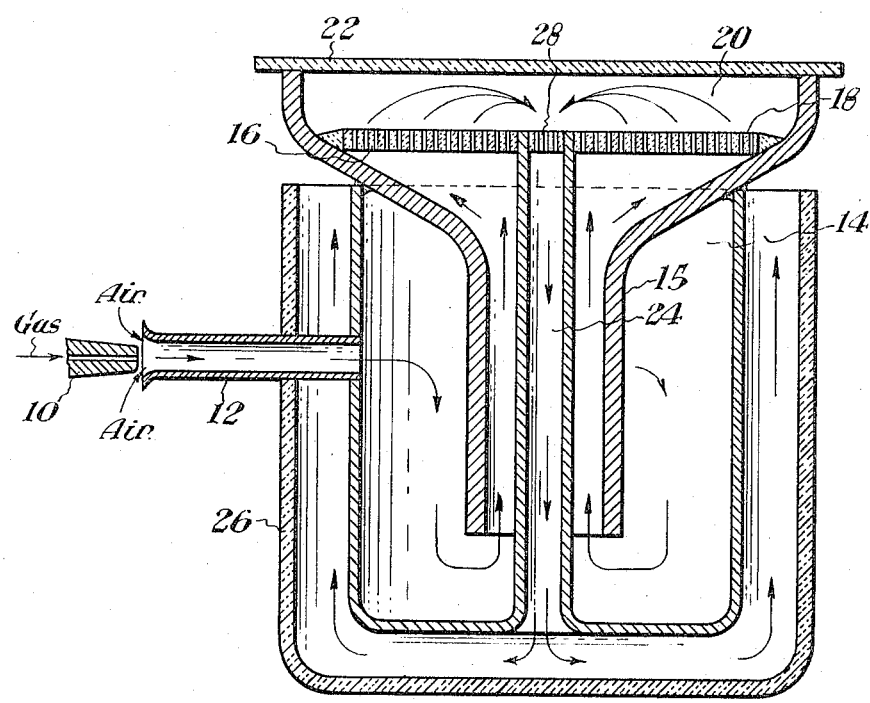

The invention will be described with reference to the accompanying drawing, in which:

FIGURE 1 is a plan view, partly in section, of a burner according to the invention, and FIGURE 2 is a sectional view of the burner taken on line 2—2 of FIGURE 1.

Referring to the drawing, a mixture of combustible gas is injected through gas inlet tube 10 into mixing tube 12. Due to the decreased pressure caused at the mouth of mixing tube 12 by the rapidly moving combustible gas, air is drawn into the mixing tube, as shown by the arrows, and the gas and air pass through the mixing tube into plenum chamber 14. The gas-air mixture then passes through baffle tube 15 and porous radiating plate 16, which preferably comprises a ceramic honeycomb structure having a plurality of passages extending therethrough capable of regulating the flow of the gas-air mixture therethrough so as to permit combustion thereof in the vicinity of combustion surface 18. The ceramic honeycomb of which burner plate 16 is formed may be that described in the above-mentioned Goss et al. patent. The heat of the combustion effected on the combustion surface of the burner plate and in combustion chamber 20 raises the temperature of the burner plate to that at which it becomes a radiator of infrared heat energy.

Combustion chamber 20 is provided with substantially nonporous cover plate 22. The presence of this substantially nonporous cover plate serves to protect the burner from the atmospheric disturbances, such as wind and rain, while at the same time causing the heated products of combustion to be directed back through gas outlet tube 24 communicating with hollow gas flow envelope 26, which substantially surrounds plenum chamber 14 and which may comprise a refractory heat-insulating material, such as fiber glass lined asbestos sheet.

Cover plate 22 may be an infrared transmitting glass having a composition approximately 96.5% $SiO_2$, 0.5% $Al_2O_3$ and 3.0% $B_2O_3$. Such glass will permit the tranmission of infrared heat energy to the space to be heated, while redirecting the heated gaseous products of combustion through gas outlet tube 24 and the gas flow envelope 26. Before passing into gas outlet tube 24, the heated products of combustion pass through auxiliary radiating plate 28, which comprises a material similar to that of the main radiating plate 16. The heated gases transfer to the auxiliary radiating plate sufficient heat to raise the auxiliary plate to a temperature at which it becomes a radiator of infrared heat energy. Thus, the products of combustion, which are conventionally treated as waste products, are utilized to increase the total infrared radiating ability of the burner. In addition, as the heated gases, not having lost all of their heat to auxiliary radiating plate 28, pass through gas outlet tube 24, and gas flow envelope 26, along the paths illustrated by the arrows, heat is transferred therefrom to the walls separating plenum chamber 14 from the gas outlet tube and the gas flow envelope. These walls, which may comprise any material having suitably high thermal conductivity, such as aluminum, become heated and, in turn, transfer heat energy to the incoming gas-air mixture in plenum chamber 14. Thus, the increased utilization of the heat energy provided by the combustion of the gas-air mixture is realized, and, in particular, an increased amount of such energy is utilized as infrared radiant heat energy.

Cover plate 22, instead of being formed of an infrared transmitting glass, may be an opaque material, such as a glass ceramic of the type disclosed in United States Patent 2,920,971, to S. D. Stookey. A cover plate of this type will absorb both energy radiated from the burner plate and energy contained in the gaseous products of combustion. The absorbed heat energy will raise the glass-ceramic cover plate to a temperature at which it will itself become a radiator of infrared heat energy.

Although the burner has been shown in its preferred embodiment as including a centrally located gas outlet tube and a gas flow envelope substantially surrounding the plenum chamber, it will be appreciated that all arrangements in which the gaseous products of combustion are caused to flow through an auxiliary burner plate as they leave the combustion chamber will effect heating of the auxiliary plate, thereby increasing the efficiency of the burner. Although it is advantageous for maximum heat transfer that the spaces through which the gas is exhausted lie adjacent to as much as possible of the walls of the plenum chamber and the combustion chamber in order to effect maximum heat transfer thereto, the advantages of the invention may be realized by other burner con-

We claim:
1. A radiant gas burner comprising
walls forming a plenum chamber,
means for injecting combustible gas into said plenum chamber,
a porous radiating plate in communication with said plenum chamber capable of being heated to a temperature at which it becomes a radiator of infrared energy,
walls forming a combustion chamber, one wall of said combustion chamber being formed at least in part by said radiating plate,
an auxiliary porous radiating plate capable of being heated to a temperature at which it becomes a radiator of infrared energy forming at least a portion of a wall of said combustion chamber, and
exhaust means for exhausting gases from said combustion chamber through said auxiliary radiating plate,
said combustion chamber having an outer wall having the ability to transfer heat energy from said burner.

2. A burner according to claim 1 in which said outer wall of said combustion chamber is substantially opposed to said radiating plates and comprises a material having a substantial transparency to infrared radiation.

3. A burner according to claim 1 in which said outer wall of said combustion chamber is substantially opposed to said radiating plates and comprises an infrared transmitting glass.

4. A burner according to claim 1 in which said outer wall of said combustion chamber comprises a material having the ability to absorb heat energy and to reradiate said energy as infrared radiation.

5. A burner according to claim 1 in which said outer wall is formed of a substantially non-porous material.

6. A burner according to claim 1 in which said exhaust means includes walls forming a chamber separated from said plenum chamber by a wall permitting heat transfer therebetween.

7. A burner according to claim 1 in which said exhaust means comprises a hollow envelope substantially surrounding said plenum chamber.

8. A burner according to claim 1 in which said radiating plates comprise a ceramic honeycomb material.

9. A radiant gas burner comprising
walls forming a plenum chamber, an outer wall of said plenum chamber comprising a material having a high thermal conductivity,
means for injecting combustible gas into said plenum chamber,
one wall of said plenum chamber comprising a porous ceramic radiating plate capable of being heated to a temperature at which it becomes a radiator of infrared energy,
walls forming a combustion chamber separated from said plenum chamber by said porous radiating plate so as to permit the flow of gas between said chambers,
at least a portion of a wall of said combustion chamber comprising a second auxiliary porous ceramic radiating plate capable of being heated to a temperature at which it becomes a radiator of infrared energy,
exhaust means for exhausting gases from said combustion chamber through said auxiliary radiating plate,
said exhaust means including a substantially hollow chamber surrounding said outer wall of said plenum chamber, and
an outer wall of said combustion chamber substantially opposed to said radiating plates comprising a substantially non-porous material having a substantial transparency to infrared heat radiation.

References Cited by the Examiner
UNITED STATES PATENTS

| | | | |
|---|---|---|---|
| 2,847,988 | 8/1958 | Hess | 158—99 X |
| 3,243,612 | 3/1966 | Lyczko | 158—99 X |

JAMES W. WESTHAVER, *Primary Examiner.*